Patented Oct. 14, 1930

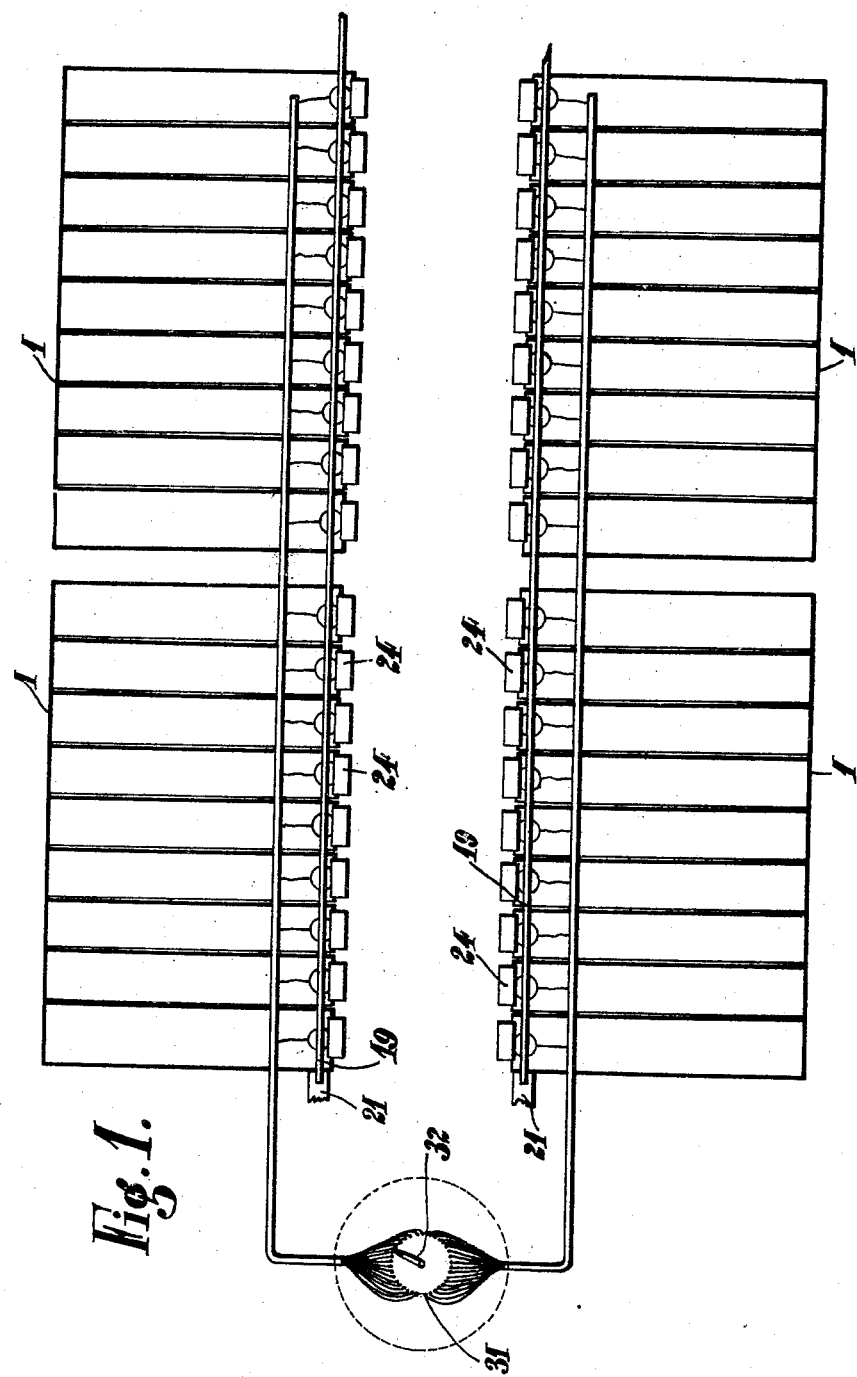

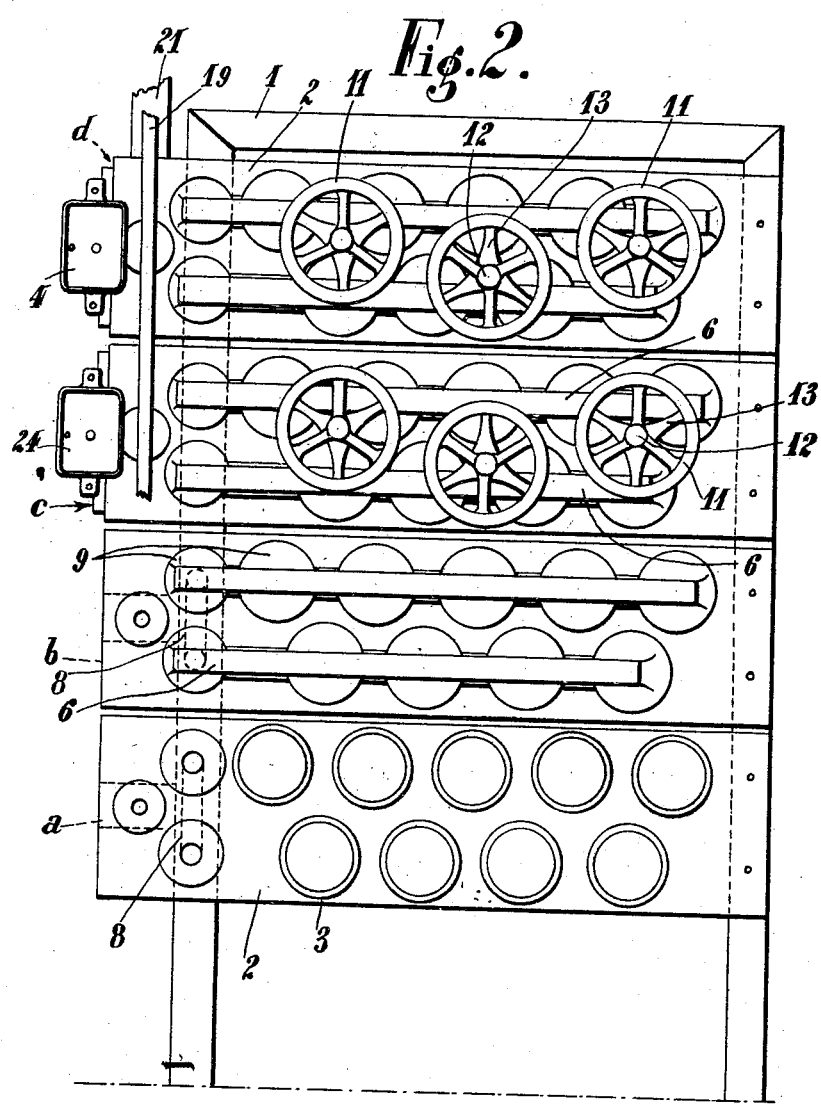

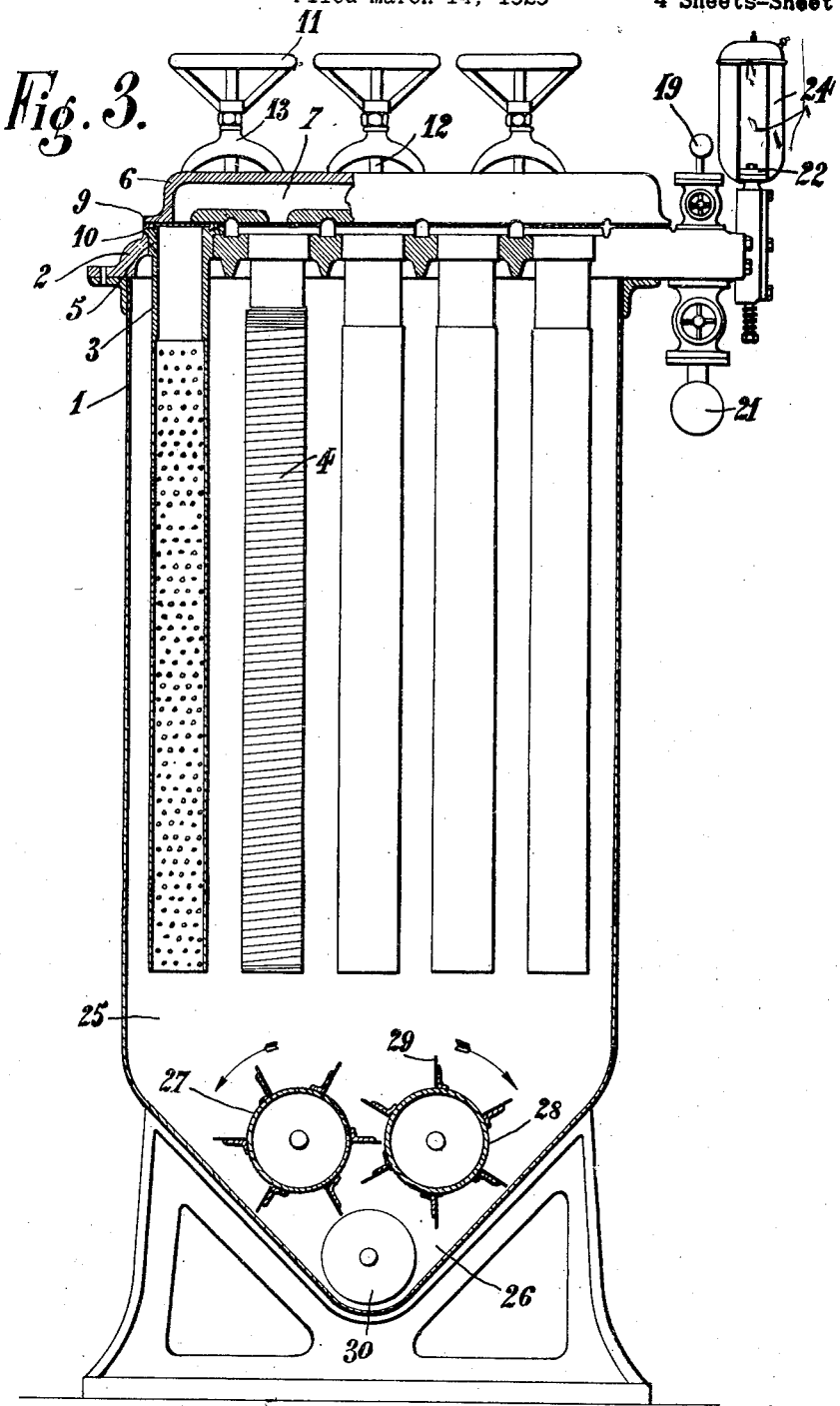

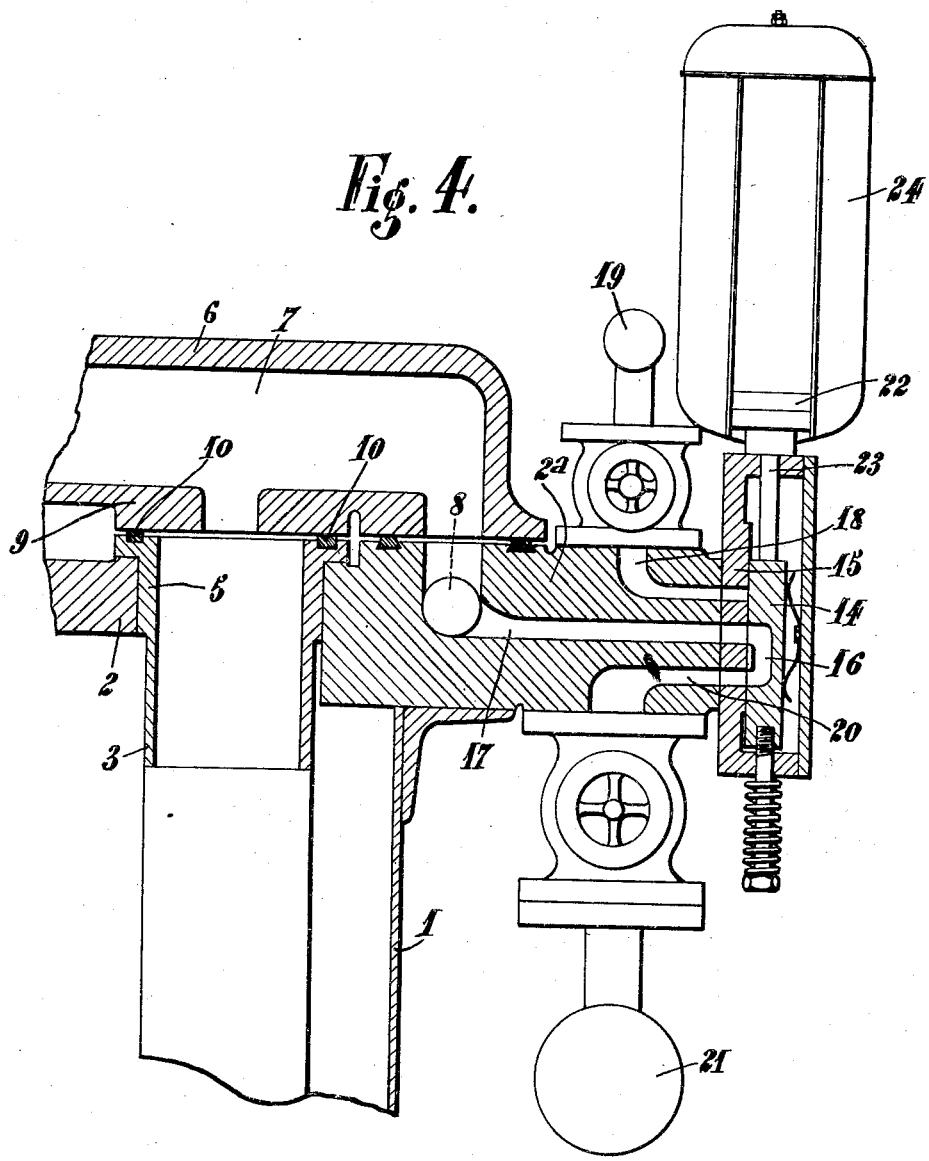

1,778,596

UNITED STATES PATENT OFFICE

EDOUARD HEIBIG, OF NEUILLY-SUR-SEINE, FRANCE, ASSIGNOR TO FILTRES PHILIPPE, OF PARIS, FRANCE, A JOINT-STOCK COMPANY OF FRANCE

CONCENTRATING AND HOMOGENIZING APPARATUS

Application filed March 14, 1929, Serial No. 346,978, and in France June 18, 1928.

The present invention relates to a concentrating and homogenizing apparatus more particularly for use in combination with a vacuum filter, for example of the rotary drum type, with a view to subjecting a liquid to the action of the filter only under conditions most favourable to proper filtering.

It is well known, as a matter of fact, that satisfactory working conditions for rotary filters only obtain when the liquid is sufficiently concentrated, that is to say that it contains a minimum quantity of solid materials arriving in a sufficiently homogeneous mass.

The above conditions are not completely satisfied by the concentrating and homogenizing apparatus as at present used to this end, although their design is particularly complicated.

With the apparatus according to the invention, it is possible on the contrary to admit into the filter a homogeneous liquid having the desired degree of concentration. It is of the type based on the principle of cleaning on the counter-flow system, that is to say of the type in which the liquid contained in a suitable cell is intermittently drawn through filter units on which the solid matter is deposited whilst there is intermittently passed over said filter units a counter-current of compressed air, the effect of which is to break off the solid matter and cause it to drop to the bottom of the cell from whence this concentrated liquid is sent to the rotary filter.

The apparatus according to the invention is essentially characterized by the fact that the cell containing the liquid to be treated is divided into an upper and a lower chamber by a device which whilst allowing the substance to pass from the upper into the lower chamber, nevertheless forms between the two chambers a partition which prevents the perturbations produced in the lower chamber by a screw or other stirrer homogenizing the liquid, from being communicated to the liquid in the upper chamber, whereby the action of the filter units is efficient and regular.

The separating device of the two chambers may be constituted to advantage by at least one, preferably two cylinders, rotating in opposite directions and extending parallel and in spaced relation to each other and to the walls of the cell, each of said cylinders being provided with vanes which rub successively against the periphery of the other cylinder and the walls of the cell, forming an instantaneous joint therewith.

According to another characteristic of the invention, the concentrating apparatus is constituted by placing adjacent each other and on the same cell, a plurality of interchangeable units independent of each other and each including a certain number of filtering tubes.

According to a form of construction, each of the interchangeable units is constituted by a plate fixed to the upper part of the cell and to which are also fixed the filtering tubes bathing in the cell and discharging to the upper face of the plate so that one or more headers clamped against said upper face shall place all said tubes in communication with each other and with a duct which a distributor may cause to communicate either with a suction pipe, for filtering, or with a compressed air pipe, for cleaning.

Each interchangeable unit has a distributor constituted, according to one form of construction, by a slide valve controlled from a distant central point. One electromagnet per slide valve may be provided to control the latter's displacement, each electromagnet being connected to one of said slide valves, whilst a central current distributor feeds the electromagnets in succession.

According to a form of embodiment, the central current distributor is constituted by a disc carrying fixed contact studs each connected to one or more electromagnets and which are electrically connected in succession to the current lead in wire by a movable contact arm rotating at constant speed.

The remote control of the slide valves may likewise be obtained with compressed air, each slide valve being actuated by a piston on which said compressed air acts intermittently.

Other characteristics and peculiarities of the invention will become apparent from the following description in conjunction with the accompanying drawings in which:

Fig. 1 is a plan view of a concentrating and homogenizing apparatus in accordance with the invention and including a plurality of cells.

Fig. 2 is a more detailed plan view of one of said cells wherein its various component parts are in process of assembly.

Fig. 3 is an enlarged view, in sectional elevation, of one of said units with several filter tubes.

Fig. 4 is likewise an enlarged view in sectional elevation of a constructional detail of the device of Fig. 3.

The apparatus illustrated very diagrammatically in Fig. 1, is constituted by a plurality of cells 1 each comprising a series of interchangeable units $a$, $b$, $c$, etc. As illustrated in Fig. 3, each of said units comprises a plate 2 fixed to the top of the cell 1 and whereon are fixed a certain number of filter tubes 3. Said tubes may be of any known type and may be made for example of perforate sheet metal over which is wound a filter cloth held in place by a spiral thread 4. Said tubes bathe in the liquid to be treated contained in the cell 1 and are flanged at the top as at 5 to allow them to be fixed in position. Obviously, as many tubes 3 as are necessary can be fixed to the same plate 2. In the case illustrated, it has been assumed that there are two rows of tubes. Opposite each row of tubes is positioned a header 6 in which is formed a duct 7 which enables all the upper orifices of the tubes 3 of a row to communicate between themselves and with a duct 8. In the case illustrated wherein there are two rows of tubes to a plate 2, there are therefore two independent headers 6, but the duct 8 previously referred to, is common to the two rows of tubes, as is shown in dotted lines opposite the units $a$ and $b$ of Fig. 2. The headers 6 have flanges 9, which, when the header is pressed down, bear against the flanges 5 with rubber joints 10 interposed therebetween to provide a tight joint. The two headers 6 may be clamped simultaneously through the medium of hand wheels 11 (Figs. 2 and 3) screwing on studs 12 fixed to the plate 2 and acting on stirrups 13 engaging simultaneously with the two headers 6.

This characteristic of the invention enables a tight joint to be obtained merely by clamping the header which takes the place of the maze of ducts and connections obtaining with the apparatus of this type as at present known.

According to the invention, for each interchangeable unit, that is to say, for each plate 2, there is provided an independent distributor, constituted for example by a slide valve 14 reciprocating in a valve box 15 mounted on an extension $2^a$ of the plate 2, said slide valve including a passage 16 which, according to its position, places the duct 17 connected to the aforementioned duct 8, in communication either with the duct 18, connected to the compressed air manifold 19, or with the duct 20 connected to the manifold 21 in which a vacuum is created.

In the example illustrated in Fig. 3, the slide valve 14 is reciprocated by an electromagnetic device broadly comprising a movable armature 22 fixed to the upper part of the rod 23 of the slide valve and on which acts an electromagnet 24 in which current is caused to flow intermittently. When the current flows through said electromagnet, the slide valve 14 is raised into its upper position and the duct 17, that is to say the various tubes 3, are then in communication with the compressed air manifold. On the contrary, when the current ceases to flow in the electromagnet 24, the slide valve 14 drops back for example under the action of a spring $14^a$ and the tubes 3 then communicate with the suction manifold 21. Since there is one distributor to an interchangeable unit, there is of course one electromagnet 24 for each unit, and it will be seen presently how the several electromagnets of the same apparatus are actuated.

Each cell 1, comprising, as has just been seen, a plurality of interchangeable units $a$, $b$, $c$, etc. is divided into an upper chamber 25 and a lower chamber 26 by two cylinders 27 and 28 extending parallel to the walls of the cell 1 and provided with external vanes 29 made of sheet metal lined with rubber for example. Said two cylinders rotate in opposite directions at reduced speed and are so positioned that in the course of rotation the vanes 29 of one cylinder come in contact either with the periphery of the other cylinder, or with the corresponding wall of the cell. The filtering tubes 3, are wholly housed in the upper chamber 25 into which the liquid to be concentrated is admitted, whilst in the lower chamber 26, any suitable stirrer is located, a screw 30 for example, whose purpose is to break up the lumps of solid matter so as to send homogeneous liquid to the rotary filter (not illustrated).

Said concentrator operates as follows.

When the duct 17 is in communication with the suction manifold 21, the solid matter contained in the liquid which is drawn through the filtering tubes 4, is deposited on the surface of the latter. When the duct 17 then communicates with the compressed air manifold 19, said compressed air impinges on each of the tubes 3 with the result that the solid matter accumulated on said tubes 3 drops off. The suction and compressed air injection stages thus succeed each other in the apparatus at intervals, and a concentration of the treated liquid is then obtained. The solid matter, or concentrated liquid, which falls to the bottom of the chamber 25 then passes into the chamber 26, for the separating device formed between the two chambers by the two cylinders 27 and 28, enables the matter to pass from the chamber 25 to the chamber 26. The concentrated liquid is then acted on by the stirrer 30 which homogenizes it and sends it to the rotary filter.

It will be observed that the two cylinders 27 and 28 prevent the perturbations produced in the lower chamber 26 by the stirrer 30 from being communicated to the upper chamber 25 and from creating perturbations in the diluted liquid which would prevent the tubes 3 from operating satisfactorily. Of course the two cylinders 27 and 28 might be replaced by an equivalent mechanical device, the invention essentially consisting in this respect, in the combination with a cell of a concentrating apparatus, of a device dividing off said cell into two chambers in such manner that the matter may freely pass from the upper chamber down to the lower chamber without the perturbations produced in the latter being transmitted to the liquid in the upper chamber.

The device illustrated diagrammatically in Fig. 1 may be adopted to advantage for successively actuating the several electromagnets 24. Said device essentially comprises a disc with fixed contact studs 31 past which rotates at constant speed a movable contact arm 32 connected, at its inner end for example, to the current lead in wire and which, as it rotates, connects said current lead in wire to each of contact studs in succession. Each of the latter is connected to one or several electromagnets 24 which are thus fed in succession.

Naturally, there may be substituted for the electromagnetic control of the distributors of the interchangeable units any equivalent control system. For example compressed air might be employed, each of the slide valves 14 being then driven by a piston reciprocating in a cylinder into which compressed air would be admitted at the requisite moment; the admission and exhaust of said compressed air will be controlled by an automatic distributor corresponding to a certain extent to the disc with contact studs and rotating contact arm of the electrical control system which has just been described. Similarly, the distributor slide valve 14 might be otherwise designed, for example to rotate.

Finally, the apparatus may be equipped with suitable regulating devices, for regulating for example the speed of rotation of the two cylinders 27 and 28, whereby the degree of concentration of the liquid may be regulated. Similarly, by regulating the angular velocity of the movable contact arm 32, the duration of each blast of compressed air as well as the interval between two consecutive blasts may be regulated. Similarly, in what has gone before only an apparatus in which cleaning is accomplished by a counter current of compressed air has been considered, but it is obvious that the invention can be applied to apparatus in which cleaning is achieved with a counter current of gas or any fluid.

It is moreover evident that the invention has only been described and illustrated here in a purely explanatory but by no means limitative manner, and that it could be subjected to various modifications of detail without departing from the spirit thereof.

I claim:

1. Concentrating and homogenizing apparatus, comprising in combination, a cell containing the liquid to be treated, a plurality of plates fixed to the top of said cell, a series of perforated tubes bathing in the liquid and depending from each of said plates with their upper ends opening on to the upper face of the plate, a plurality of headers located above the upper ends of said tubes and clamped to said plates, means for creating a vacuum, means for producing an air blast, each of said plates having formed therein three ducts communicating respectively with the associated header, the vacuum creating means and the blast producing means, and means for placing the duct leading to the header in communication with either of said other two ducts whereby a suction is created in said tubes or an air blast delivered thereto.

2. Concentrating and homogenizing apparatus, comprising in combination, a cell containing the liquid to be treated, a plurality of plates fixed to the top of said cell, a series of perforated tubes depending from each of said plates with the upper ends opening on to the upper face of the plate, a plurality of headers resting on the upper flanged ends of said tubes with packing material inserted therebetween, means for clamping said headers to said plates, means for creating a vacuum, means for producing an air blast, each of said plates having formed therein three ducts communicating respectively with the associated header, the vacuum creating means and the blast producing means, and means for placing the duct leading to the header in communication with either of said other two ducts whereby a suction is created in said tubes or an air blast delivered thereto.

3. Concentrating and homogenizing apparatus, comprising in combination, a cell containing the liquid to be treated, a plurality of plates fixed to the top of said cell, a series of perforated tubes bathing in the liquid and depending from each of said plates with their upper ends opening on to the upper face of the plate, a plurality of headers located above the upper ends of said tubes and clamped to said plates, means for creating a vacuum in said tubes for purposes of filtering, means for delivering a blast to said tubes for cleaning said tubes, means associated with each plate for placing the corresponding header, and hence its associated tubes, in communication with either said vacuum creating or said blast producing means, a plurality of positively operated electro-magnets for actuating said last mentioned means, and means for energizing each of said electro-magnets in turn.

4. Concentrating and homogenizing apparatus, comprising in combination, a cell containing the liquid to be treated, a plurality of plates fixed to the top of said cell, a series of perforated tubes bathing in the liquid and depending from each of said plates with their upper ends opening on to the upper face of the plate, a plurality of headers located above the upper ends of said tubes and clamped to said plates, means for creating a vacuum in said tubes for purposes of filtering, means for delivering a blast to said tubes for cleaning said tubes, means associated with each plate for placing the corresponding header, and hence its associated tubes, in communication with either said vacuum creating or said blast producing means, a plurality of positively operated electro-magnets for actuating said last mentioned means, and a central electrical distributor for energizing each of said electro-magnets in turn.

EDOUARD HEIBIG.